(12) United States Patent
Ahn et al.

(10) Patent No.: US 10,337,683 B2
(45) Date of Patent: Jul. 2, 2019

(54) HEAD LAMP APPARATUS FOR VEHICLE

(71) Applicants: Hyundai Motor Company, Seoul (KR); Kia Motors Corp., Seoul (KR); SL Corporation, Daegu (KR)

(72) Inventors: Byoung Suk Ahn, Gwacheon-si (KR); Jik Soo Shin, Incheon (KR); Ki Hong Lee, Seoul (KR); Jung Wook Lim, Seoul (KR); Keun Sig Lim, Yongin-si (KR); Hyo Kyoung Kim, Gyeongsan-si (KR); Seung Mok Yang, Gyeongsan-si (KR); Sung Wook Yoon, Seoul (KR)

(73) Assignees: Hyundai Motor Company, Seoul (KR); Kia Motors Corp., Seoul (KR); SL Corporation, Daegu (KR)

( * ) Notice: Subject to any disclaimer, the term of this patent is extended or adjusted under 35 U.S.C. 154(b) by 0 days.

(21) Appl. No.: 15/813,366

(22) Filed: Nov. 15, 2017

(65) Prior Publication Data

US 2018/0340663 A1   Nov. 29, 2018

(30) Foreign Application Priority Data

May 23, 2017  (KR) .................. 10-2017-0063264

(51) Int. Cl.
*B60Q 1/00*   (2006.01)
*F21V 9/30*   (2018.01)
(Continued)

(52) U.S. Cl.
CPC ............ *F21S 41/16* (2018.01); *B60Q 1/0035* (2013.01); *B60Q 1/076* (2013.01); *F21S 41/141* (2018.01); *F21S 41/18* (2018.01); *F21S 41/30* (2018.01); *F21V 9/30* (2018.02); *F21V 14/04* (2013.01); *B60Q 2300/056* (2013.01); *B60Q 2300/42* (2013.01); *B60Q 2300/45* (2013.01); *F21Y 2115/10* (2016.08)

(58) Field of Classification Search
CPC .. F21S 41/16; F21S 41/30; F21S 41/18; F21S 41/141; F21V 9/30; F21V 14/04; B60Q 1/0035; B60Q 1/076
USPC ........................................................ 362/259
See application file for complete search history.

(56) References Cited

U.S. PATENT DOCUMENTS

2005/0063194 A1* 3/2005 Lys ...................... B60Q 1/2696
                                                         362/545
2008/0186725 A1* 8/2008 Schlager .............. B60Q 1/0058
                                                         362/507
(Continued)

FOREIGN PATENT DOCUMENTS

JP         4881255 B2    12/2011
JP         5907384 B2     4/2016
KR   10-2007-0098953 A   10/2007

*Primary Examiner* — Bryon T Gyllstrom
(74) *Attorney, Agent, or Firm* — Morgan, Lewis & Bockius LLP

(57) ABSTRACT

A head lamp apparatus may control a supply of power to a laser diode based on a quantity of white light outputted to an outside environment in the head lamp apparatus using the laser diode as a light source, and controls a power supply using only a quantity of pure white light excluding noise light when the supply of power to the laser diode is controlled, thus maximally preventing blue laser beams, which are harmful to human bodies, from being exposed to the outside environment, and allowing an operation of a head lamp to be precisely controlled.

10 Claims, 3 Drawing Sheets

(51) Int. Cl.
*B60Q 1/076* (2006.01)
*F21S 41/14* (2018.01)
*F21S 41/16* (2018.01)
*F21S 41/30* (2018.01)
*F21V 14/04* (2006.01)
*F21S 41/141* (2018.01)
*F21Y 115/10* (2016.01)

(56) References Cited

U.S. PATENT DOCUMENTS

| | | | | |
|---|---|---|---|---|
| 2009/0046474 A1* | 2/2009 | Sato | ............... | B60Q 1/076 |
| | | | | 362/466 |
| 2011/0063115 A1* | 3/2011 | Kishimoto | ............... | F21K 9/00 |
| | | | | 340/600 |
| 2011/0084609 A1* | 4/2011 | Kawaguchi | ......... | F21V 23/0442 |
| | | | | 315/77 |
| 2011/0096560 A1* | 4/2011 | Ryu | ............... | C09K 11/0883 |
| | | | | 362/510 |
| 2011/0121731 A1* | 5/2011 | Tsutsumi | ............ | H01L 25/0753 |
| | | | | 315/77 |
| 2013/0003403 A1* | 1/2013 | Takahira | ............. | B60Q 1/0023 |
| | | | | 362/538 |
| 2015/0062943 A1* | 3/2015 | Takahira | ............... | F21S 41/675 |
| | | | | 362/510 |
| 2017/0113599 A1* | 4/2017 | Park | ............... | F21S 41/36 |
| 2017/0267175 A1* | 9/2017 | Ichikawa | ............... | B60Q 1/04 |
| 2017/0307161 A1* | 10/2017 | Gabler | ............... | F21S 41/37 |
| 2017/0307164 A1* | 10/2017 | Atoji | ............... | B60Q 1/04 |

* cited by examiner

HEAD LAMP APPARATUS FOR VEHICLE

CROSS-REFERENCE(S) TO RELATED APPLICATIONS

The present application claims priority to Korean Patent Application No. 10-2017-0063264, filed on May 23, 2017, the entire contents of which is incorporated herein for all purposes by this reference.

BACKGROUND OF THE INVENTION

Field of the Invention

The present invention relates to a head lamp apparatus and, more particularly, a head lamp apparatuses configured to utilize a laser diode as a light source.

Description of Related Art

A head lamp of a vehicle is a lamp that illuminates a front field of view to secure a driver's visibility. The head lamp usually uses any one of halogen, High Intensity Discharge (HID), an LED diode, and a laser diode as a light source.

The halogen, HID, and LED diode are disadvantageous in that they are high in power consumption and are low in light efficiency, and an entire size of an optical system including a light source and a lens is large, thus reducing a degree of freedom in design and increasing a weight of the system. Meanwhile, the laser diode is advantageous in that it is environment-friendly, has a long service life, and high light efficiency.

The optical system of the head lamp using the laser diode as the light source generally includes a laser diode that generates a laser beam in a blue wavelength range (generally, a short wavelength of 450 nm), a fluorescent substance that reacts with light outputted from the laser diode to output white light, a housing that supports the laser diode and the fluorescent substance, and a reflector that reflects the white light outputted from the fluorescent substance to the front of the vehicle.

The blue laser beam emitted from the laser diode is a component which is harmful to a human body. When the blue laser beam is directly exposed to an outside environment, the blue laser beam may cause a permanent damage to a human's eye. Thus, there has been developed a method in which the blue laser beam reacts with yellow excitation light of the fluorescent substance to output the white light which is harmless to a human body.

However, when power is continuously inputted into the laser diode while satisfying any one of the following conditions: when the disposition location of the laser diode or the fluorescent substance deviates from a provided position or the fluorescent substance is damaged due to a vehicle accident, the risk of causing an accident may be increased as a probability that the blue laser beam, which is harmful to the human body, will be exposed to the outside environment is increased.

The information disclosed in the present Background of the Invention section is only for enhancement of understanding of the general background of the invention and should not be taken as an acknowledgement or any form of suggestion that the present information forms the prior art already known to a person skilled in the art.

BRIEF SUMMARY

Various aspects of the present invention are directed to providing a head lamp apparatus for a vehicle, which detects a quantity of white light outputted through a fluorescent substance in the head lamp apparatus using a laser diode as a light source, and then controls a supply of power to the laser diode based on the detected quantity of white light, thus maximally preventing blue wavelength laser beams, which are harmful to human bodies, from being exposed to an outside environment.

Alternatively, various aspects of the present invention are directed to providing a head lamp apparatus for a vehicle, which controls a power supply using only a quantity of pure white light excluding noise light when the supply of power to the laser diode is controlled based on the detected quantity of white light, thus allowing an operation of a head lamp to be more precisely controlled.

According to various aspects of the present invention, there is provided a head lamp apparatus for a vehicle including a first photodiode configured for detecting a quantity of outputted white light when a blue laser beam generated from a laser-light-source module is outputted through a fluorescent substance to the white light, and then converting the quantity of the outputted white light into a value of first electrical energy; a second photodiode configured for detecting a quantity of noise light excluding the quantity of the white light outputted through the fluorescent substance, and then converting the quantity of the noise light into a value of second electrical energy; and a controller configured for controlling a supply of power to the laser-light-source module using the value of the first electrical energy and the value of the second electrical energy.

When it may be determined by the controller that the value of the second electrical energy may be zero, the controller may control the supply of power to the laser-light-source module by comparing the value of the first electrical energy with a reference value.

Unless the value of the first electrical energy is disposed in the reference value, the controller may interrupt power that may be inputted into the laser-light-source module.

When it may be determined by the controller that the value of the second electrical energy may be a value exceeding zero, the controller may control the supply of power to the laser-light-source module by comparing a value, obtained by subtracting the value of the second electrical energy from the value of the first electrical energy, with the reference value.

Unless the value obtained by subtracting the value of the second electrical energy from the value of the first electrical energy is disposed in the reference value, the controller may interrupt power that may be inputted into the laser-light-source module.

The head lamp apparatus may further include a housing configured to accommodate the laser-light-source module, the fluorescent substance, and the first and second photodiodes therein; and a reflector reflecting the white light, outputted from the fluorescent substance, to the front of the vehicle.

The first photodiode may be fixedly disposed at a position where it may easily receive the white light, while being located on a light path which the white light may be outputted.

The first photodiode may be fixedly disposed at a top portion of the housing to face the reflector.

The second photodiode may be fixedly disposed at a position where it may be impossible to receive the white light, while being located at positions other than the light path along which the white light may be outputted.

The second photodiode may be fixedly disposed at a front surface of the housing that may not face the reflector.

The head lamp apparatus of the invention is advantageous in that it controls the supply of power to the laser diode based on the quantity of white light outputted through the fluorescent substance in the head lamp apparatus using the laser diode as the light source, thus maximally preventing blue laser beams, which are harmful to human bodies, from being exposed to an outside environment.

Furthermore, the head lamp apparatus of the invention is advantageous in that it controls the power supply using only the quantity of pure white light excluding noise light when the supply of power to the laser diode is controlled based on the quantity of white light, thus allowing the operation of the head lamp to be more precisely controlled.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
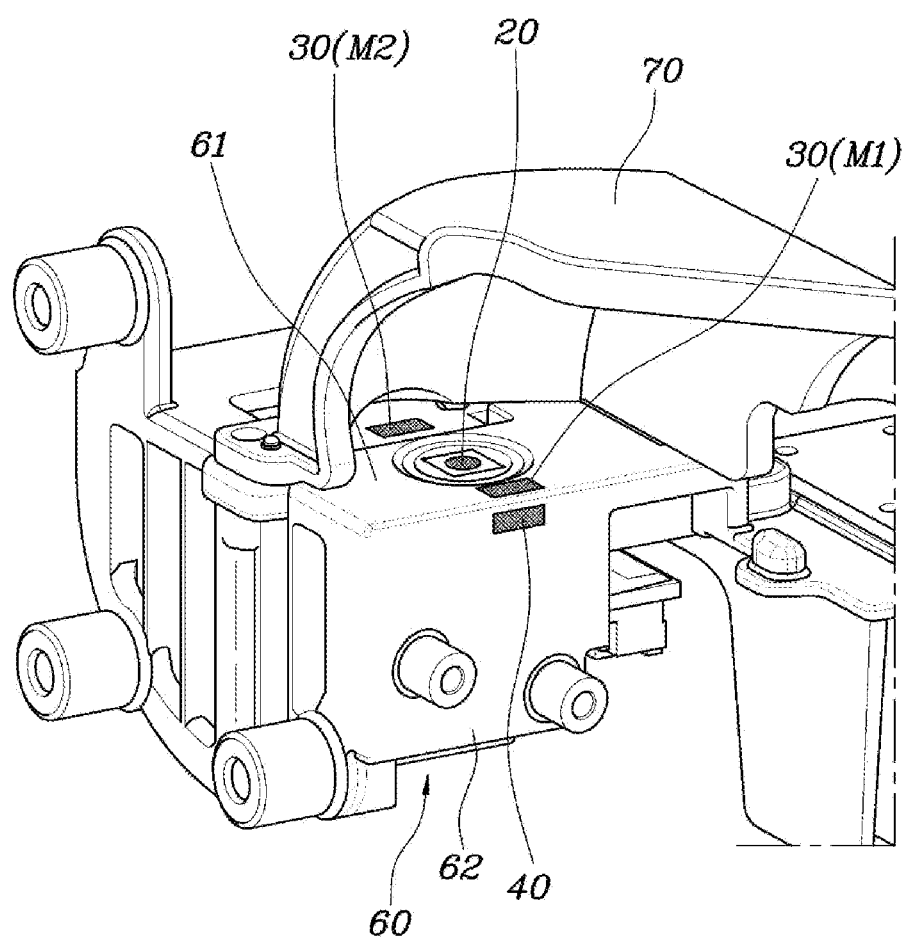
FIG. 1 is a perspective view illustrating a head lamp apparatus for a vehicle according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), exemplary embodiments of which are illustrated in the accompanying drawings and described below. While the invention(s) will be described in conjunction with exemplary embodiments, it will be understood that the present description is not intended to limit the invention(s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Figure 2:
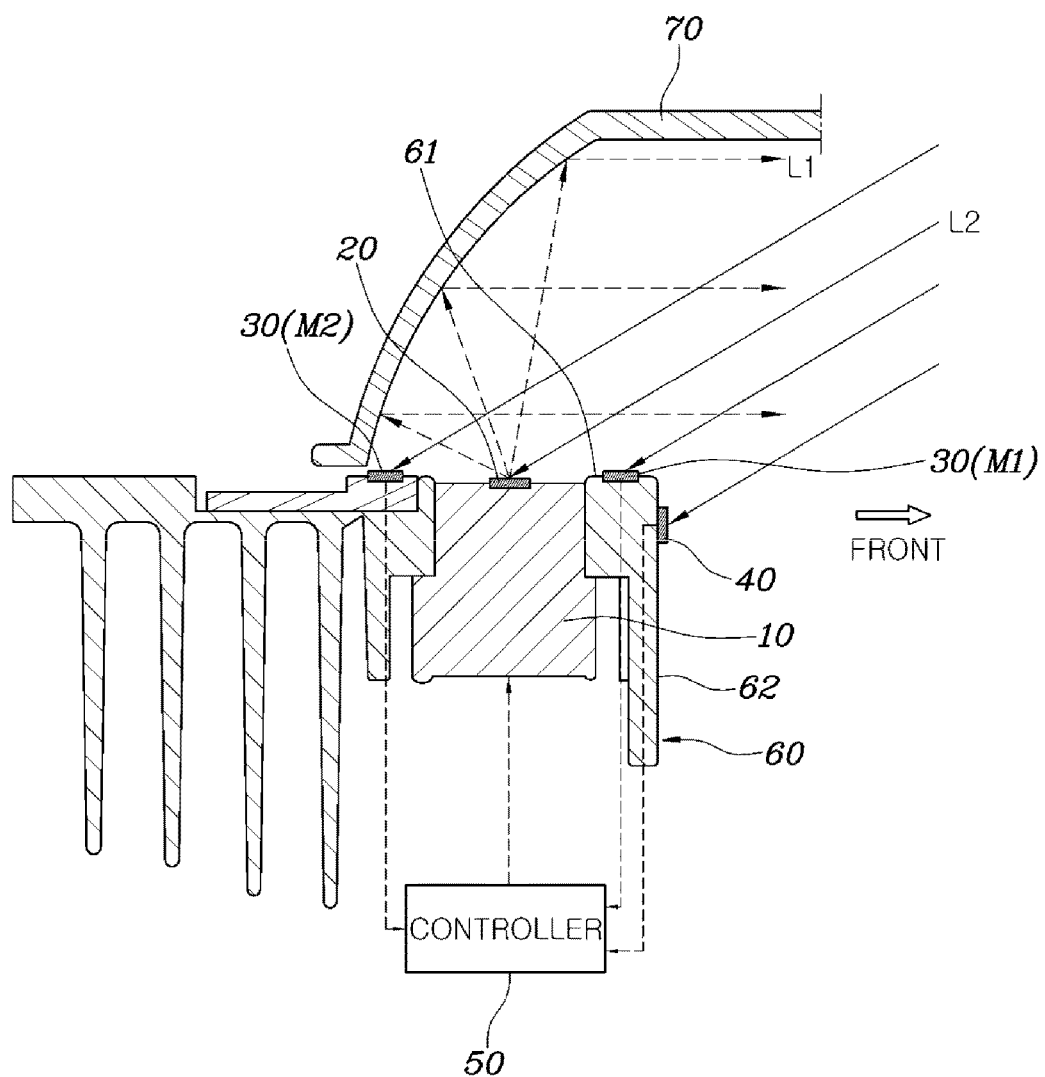
FIG. 2 is a sectional view of FIG. 1.

A head lamp apparatus according to an exemplary embodiment of the present invention is configured to use a laser diode as a light source. As illustrated in FIG. 1 and FIG. 2, the head lamp apparatus includes a laser-light-source module 10 using the laser diode as the light source and generates a laser beam in a blue wavelength range (generally, a short wavelength of 450 nm); a fluorescent substance 20 that reacts with light outputted from the laser-light-source module 10 to output white light L1; a first photodiode 30 that detects a quantity of the white light L1 outputted through the fluorescent substance 20 to convert the quantity of white light L1 into a value of first electrical energy E1; a second photodiode 40 that detects a quantity of noise light L2 excluding the quantity of the white light L1 outputted through the fluorescent substance 20 to convert the quantity of noise light L2 into a value of second electrical energy E2; a controller 50 configured for controlling a power supply to the laser-light-source module 10 using the value of the first electrical energy E1 and the value of the second electrical energy E2; a housing 60 in which the laser-light-source module 10, the fluorescent substance 20, the first photodiode 30, and the second photodiode 40 are disposed; and a reflector 70 that reflects the white light L1, outputted from the fluorescent substance 20, to a front of a vehicle.

The controller 50 is preferably a Printed Circuit Board (PCB) which is fixedly coupled to the housing 60, but the present invention is not limited thereto.

The first and second photodiodes 30 and 40 are configured to transmit and receive an electrical signal to or from the controller 50.

The noise light L2 is light other than the white light outputted through the fluorescent substance 20, namely, light generated by disturbances. The noise light includes light generated from a streetlamp, light generated from a head lamp of an oncoming vehicle, sunlight, moonlight, and other sources of light.

The first photodiode 30, configured for detecting the quantity of the white light, is fixedly disposed at a position where it may easily receive the white light, while being located at a light path along which the white light L1 is outputted. The first photodiode 30 is fixedly disposed at a top portion 61 of the housing 60 facing the reflector 70 to be adjacent to the fluorescent substance 20.

The first photodiode 30 may be disposed at either of a front position M1 or a rear position M2 of the fluorescent substance 20 with respect to the fluorescent substance 20.

The second photodiode 40, configured for detecting the noise light L2 by the disturbance, is fixedly disposed at a position where it is impossible to receive the white light, while being located at positions other than the light path along which the white light is outputted. The second photodiode 40 is fixedly disposed at a front surface 62 of the housing 60 that does not face the reflector 70.

The front surface 62 of the housing 60 does not lie on the path of the white light which is outputted to the front of the vehicle, but is located at a position where it may easily receive the noise light L2 by the disturbance.

Figure 3:
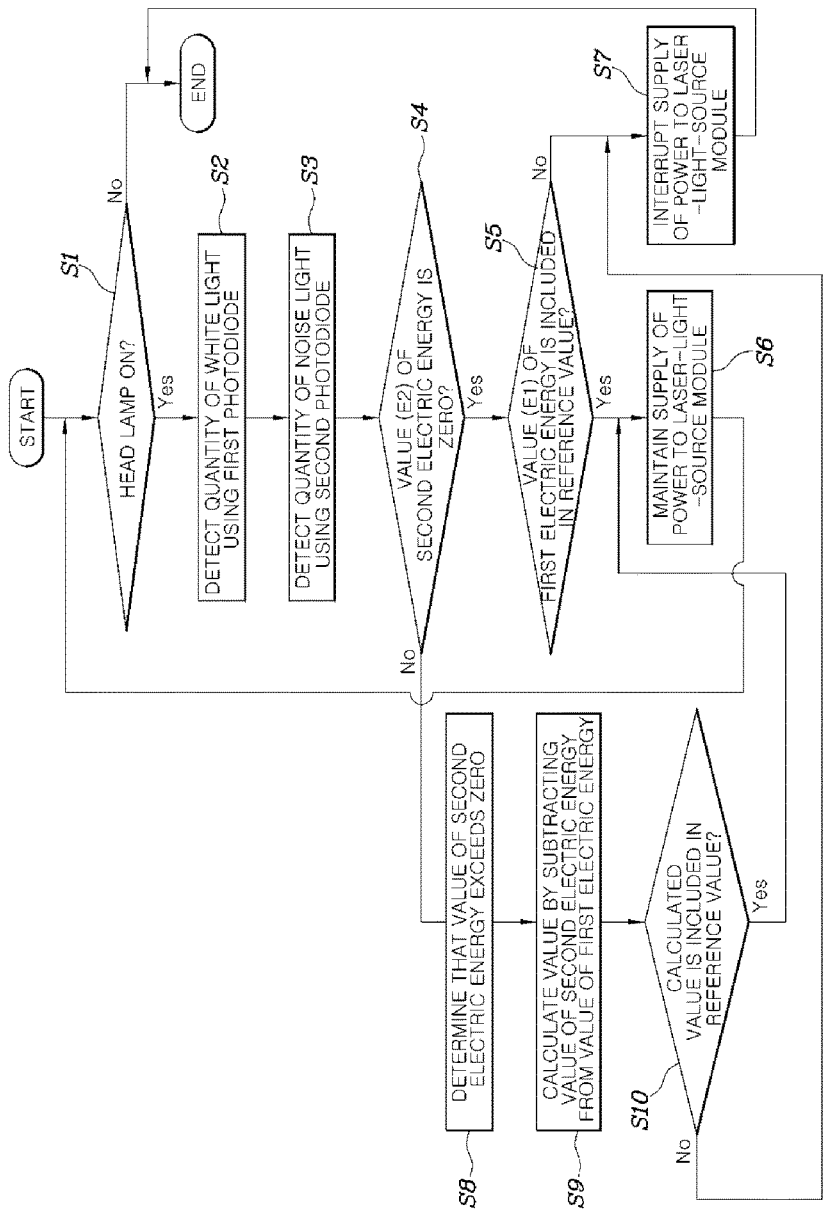
FIG. 3 is a flowchart illustrating a method of controlling an operation of a head lamp apparatus for a vehicle according to an exemplary embodiment of the present invention.

A method of controlling an operation of the head lamp apparatus for the vehicle according to an exemplary embodiment of the present invention will be described with reference to FIG. 3.

The blue laser beam emitted from the laser diode is a component which is harmful to a human body. When the blue laser beam is directly exposed to the outside environment due to a vehicle accident or the like, the human eye may be permanently injured. Thus, the present invention may rapidly prevent a situation where the blue laser beam, which is harmful to the human body, is exposed to the outside environment.

That is, when the head lamp is ON (S1), the first photodiode 30 detects the quantity of the white light L1 outputted through the fluorescent substance 20 (S2), and the second photodiode 40 detects the quantity of the noise light L2 excluding the white light outputted through the fluorescent substance 20 (S3).

The first photodiode 30 converts the detected quantity of the white light into the value of the first electrical energy E1, and the second photodiode 40 converts the detected quantity of the noise light into the value of the second electrical energy E2.

The controller 50 receives the value of the first electrical energy E1 and the value of the second electrical energy E2 from the first photodiode 30 and the second photodiode 40, and determines whether the value of the second electrical energy E2 is zero or a value more than zero (S4).

When the value of the second electrical energy E2 is zero, there is no noise light L2 caused by disturbances. Meanwhile, when the value of the second electrical energy E2 is more than zero, there exists the noise light L2 caused by disturbances.

When it is determined that the value of the second electrical energy E2 exceeds zero and there exists the noise light L2, it can be seen that the quantity of the noise light is disposed in the quantity of the white light detected by the first photodiode 30. Likewise, it can be seen that the value of the second electrical energy E2 outputted by the quantity of the noise light is disposed in the value of the first electrical energy E1 outputted by the quantity of the white light.

Thus, when it is determined that the value of the second electrical energy E2 is zero, it is determined whether the value of the first electrical energy E1 is disposed in the reference value. Based on the provided result, the controller determines whether to interrupt power which is inputted into the laser-light-source module.

However, when it is determined that the value of the second electrical energy E2 is more than zero, it is determined whether a value obtained by subtracting the value of the second electrical energy E2 from the value of the first electrical energy E1 is disposed in the reference value to more precisely control the operation of the head lamp. Based on the present result, the controller determines whether to interrupt power which is inputted into the laser-light-source module.

The above case will be described below in more detail: when it is determined at S4 that the value of the second electrical energy E2 is zero, it is determined whether the value of the first electrical energy E1 is disposed in the reference value (reference value or predetermined range that becomes output voltage of the white light when the white light is outputted in a normal state) (S5). Based on the present determined result, when it is determined that the value of the first electrical energy E1 is disposed in the reference value, it is determined that the white light is outputted in a normal state, namely, the blue laser beam is not directly exposed to the outside environment. In the present case, the controller 50 continuously supplies power to the laser-light-source module 10 (S6).

However, it is determined at S5 that the value of the first electrical energy E1 is not included in the reference value (the value of the first electrical energy E1 is smaller than the reference value), the white light is not normally outputted, namely, the disposition location of the fluorescent substance 20 deviates from a provided position or the fluorescent substance 20 is damaged. In the present case, it is determined that the blue laser beam, which is harmful to the human body, is directly exposed to the outside environment. In the present case, the controller 50 interrupts the supply of power to the laser-light-source module 10 (S7). Therefore, it is possible to rapidly prevent the blue laser beam from being exposed to the outside environment.

Meanwhile, when it is determined at S4 that the value of the second electrical energy E2 is not zero, it is determined that the value of the second electrical energy E2 is more than zero (S8). In the present case, to more precisely control the operation of the head lamp, a value obtained by subtracting the value of the second electrical energy E2 from the value of the first electrical energy E1 is detected (S9), and it is determined whether the detected value is disposed in the reference value (S10).

When it is determined at S10 that the determined value is disposed in the reference value, it is determined that the white light is outputted in a normal state, namely, the blue laser beam is not directly exposed to the outside environment. In the present case, the controller 50 continuously supplies the power to the laser-light-source module 10 (S6).

However, when it is determined at S10 that the determined value is not included in the reference value (the determined value is smaller than the reference value), the white light is not normally outputted, namely, the disposition location of the fluorescent substance 20 deviates from a provided position or the fluorescent substance 20 is damaged. In the present case, it is determined that the blue laser beam, which is harmful to the human body, is directly exposed to the outside environment. In the present case, the controller 50 interrupts the supply of power to the laser-light-source module 10 (S7). Therefore, it is possible to rapidly prevent the blue laser beam from being exposed to the outside environment.

As having described, various aspects of the present invention are directed to providing a head lamp apparatus, which controls the supply of power to a laser diode based on a quantity of white light outputted through a fluorescent substance in the head lamp apparatus using the laser diode as a light source, thus maximally preventing blue laser beams, which are harmful to human bodies, from being exposed to an outside environment.

Furthermore, various aspects of the present invention are directed to providing a head lamp apparatus, which controls a power supply using only a quantity of pure white light excluding noise light when the supply of power to a laser diode is controlled based on a quantity of white light, thus allowing an operation of a head lamp to be more precisely controlled.

For convenience in explanation and accurate definition in the appended claims, the terms "upper", "lower", "up", "down", "upwards", "downwards", "internal", "outer", "inside", "outside", "inwardly", "outwardly", "internal", "external", "front", "rear", "back", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A head lamp apparatus for a vehicle comprising:
   a first photodiode configured for detecting a quantity of outputted white light when a blue laser beam generated from a laser-light-source module is outputted through a fluorescent substance to output the white light, and then converting a quantity of the outputted white light into a value of first electrical energy;

a second photodiode configured for detecting a quantity of noise light excluding the quantity of the white light outputted through the fluorescent substance, and then converting the quantity of the noise light into a value of second electrical energy;

a controller configured for controlling a supply of power to the laser-light-source module using the value of the first electrical energy and the value of the second electrical energy;

a housing accommodating the laser-light-source module, the fluorescent substance, and the first photodiode therein; and a reflector reflecting the white light, outputted from the fluorescent substance to a front of the vehicle, wherein the first photodiode is fixedly disposed at a top portion of the housing to face an inner surface of the reflector.

2. The head lamp apparatus according to claim 1, wherein, when the controller determines that the value of the second electrical energy is zero, the controller is configured to control the supply of power to the laser-light-source module by comparing the value of the first electrical energy with a reference value.

3. The head lamp apparatus according to claim 2, wherein, unless the value of the first electrical energy is disposed in the reference value, the controller is configured to interrupt power which is inputted into the laser-light-source module.

4. The head lamp apparatus according to claim 1, wherein, when the controller determines that the value of the second electrical energy is a value exceeding zero, the controller is configured to control the supply of power to the laser-light-source module by comparing a value, obtained by subtracting the value of the second electrical energy from the value of the first electrical energy, with the reference value.

5. The head lamp apparatus according to claim 4, wherein, unless the value obtained by subtracting the value of the second electrical energy from the value of the first electrical energy is disposed in the reference value, the controller is configured to interrupt power which is inputted into the laser-light-source module.

6. The head lamp apparatus according to claim 1, wherein the second photodiode is disposed on the housing.

7. The head lamp apparatus according to claim 6, wherein the first photodiode is fixedly disposed at a location to receive the white light, while being located on a light path which the white light is outputted.

8. The head lamp apparatus according to claim 6, wherein the second photodiode is fixedly disposed at a location to not receive the white light, while being located at positions except the light path along which the white light is outputted.

9. The head lamp apparatus according to claim 6, wherein the second photodiode is fixedly disposed at a front surface of the housing that does not face the reflector.

10. The head lamp apparatus according to claim 1, wherein the laser-light-source module is aligned to face the inner surface of the reflector.

* * * * *